T. G. STRATER.
FAUCET.
APPLICATION FILED APR. 15, 1916.
1,228,846.
Patented June 5, 1917.
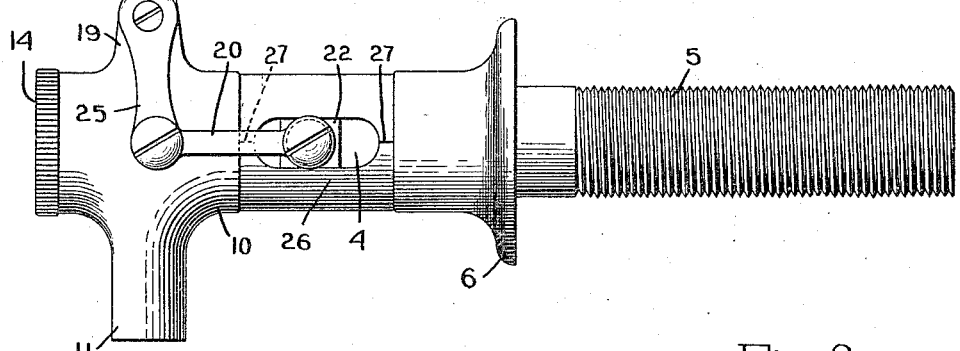
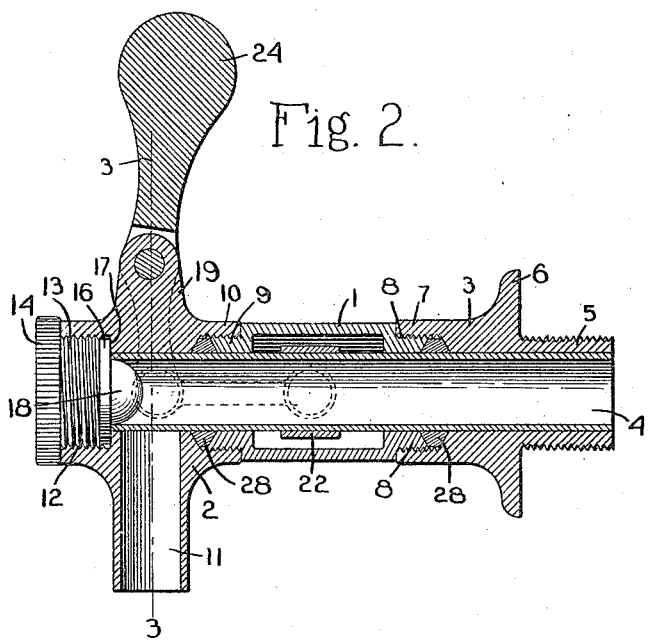
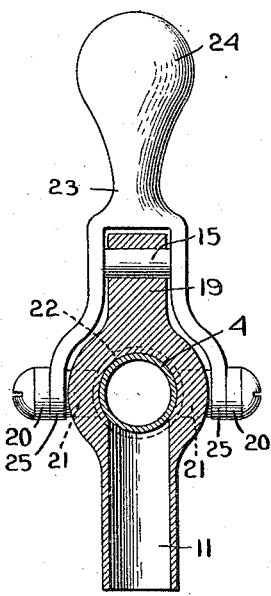
Inventor.
Theodore G. Strater
by Heard Smith & Tennant
Attys.

UNITED STATES PATENT OFFICE.

THEODORE G. STRATER, OF WEST TISBURY, MASSACHUSETTS, ASSIGNOR TO HERMAN STRATER & SONS, OF BOSTON, MASSACHUSETTS, A FIRM.

FAUCET.

1,228,846.  Specification of Letters Patent.  Patented June 5, 1917.

Application filed April 15, 1916. Serial No. 91,444.

*To all whom it may concern:*

Be it known that I, THEODORE G. STRATER, a citizen of the United States, residing at West Tisbury, county of Dukes, State of Massachusetts, have invented an Improvement in Faucets, of which the following description, in connection with the accompanying drawing, is a specification, like characters on the drawing representing like parts.

This invention relates to a novel improvement in faucets and, more particularly, to an improvement in that type wherein the valves are cylindrical in form and in which the valve is lever operated.

In the faucets generally in use at present wherein substantially cylindrical, reciprocatory valves are employed, the operating member is connected to the valve in such manner that a considerable degree of side-thrust is attendant upon valve movement. This novel device is designed to produce a structure wherein the motion of the lever or other operating instrumentality is transmitted to the valve member in approximately the plane of the valve path. A linkage organization is provided to effect this function so that at no point, throughout the whole travel of the valve, does the angle between the valve and the link attain an amount sufficient to entail appreciable side-thrust of the valve in its mounting. In the common types of faucets of this general structure, without such linkage, the actuating mechanism functions through a wide angle and in such power transmission there is entailed a relatively high component of side-thrust.

This side-thrust is disadvantageous in that it produces undue wear of the valve, and tends to force the valve out of alinement, preventing its proper seating, destroying the valve seat, causing leakage, entailing more force to operate and increased wear of moving parts and greatly injuring the utility of the faucet. The link motion herein employed has been devised to overcome and does overcome these defects and disadvantages and provides a smoothly working faucet whose parts stand up well under hard service, the side-thrust and attendant function of which have been approximately reduced to a minimum.

The object of this invention is to provide a durable and efficient faucet.

Other objects of this invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within its reasonable scope.

In the drawings,

Figure 1 is a side elevation of the faucet;

Fig. 2 is a longitudinal section through the faucet;

Fig. 3 is a section on the line 3—3, Fig. 2.

In the selected embodiment here shown the faucet has, generally, three exterior structural members constituting the casing, comprising: the substantially cylindrical body 1, the hollowed head 2, and the nipple 3. The assembled casing substantially presents a hollow cylindrical instrumentality in which is reciprocally borne the valve 4 which is shown as a tube.

While the casing may be assembled in any suitable manner, the preferred form is here shown, The nipple 3 has its end 5 screw-threaded in order that it may be easily secured to a container for the fluid. A flange 6 is formed on the nipple and is adapted to press against the container side in which the nipple is received in threaded engagement and thus to effect a fluid-tight joint. The other end of the nipple terminates in an interiorly threaded sleeve-like member 7 which receives in threaded engagement the exteriorly-threaded end 8 of the cylindrical body 1. The other end 9 of this member 1 is preferably reduced and threaded to engage the interiorly-threaded cylindrical boss 10 of the head 2. The tubular valve 4 which reciprocates in this casing is provided with a valve seat in the head adjacent the discharge spout 11 thereof. This valve seat is preferably easily demountable for cleansing, replacement or repair and for this purpose the substantially central way through the head has an enlarged portion 12 which is interiorly threaded to engage the screw cap 13 which preferably has a milled outer edge 14 to afford facility in manipulation. A valve seat of suitable material, preferably of some common rubber or gutta percha composition, is provided. This seat has a flanged portion 16 which is positioned against the annular shoulder 17 of the head, being held thereagainst by means of the screw-cap 13. The valve seat preferably is afforded a central, substantially hemispherical portion 18 which is received within the end of the tubular valve when in seated position. This hemispherical portion functions to effect a more efficient valve seat. This spout 11 communicates from the faucet exterior to the central way of the head, so that when the valve is moved from the seat, the fluid in the valve may have outlet through the spout. In this selected embodiment, the casing parts are formed from castings, the respective portions of each of which being, as shown, preferably integral.

Novel means for reciprocating the tubular valve are provided wherein the valve-moving force is substantially applied throughout its path in the longitudinal plane of the valve. This is accomplished by the employment of a link transmission. In the embodiment shown, a pair of links 20 are employed, one each being positioned on diametrically opposed sides of the valve. Such construction functions to equalize the application of the valve-moving force on each side of the valve and to result in more direct valve movement. Each link 20 is operatively mounted so as to secure an approximately rectilinear movement. Such rectilinear force application functions to minimize or to obviate any tendency to rock the valve or to set up the disadvantageous sidethrust component in the valve movement. These links are pivotally secured to the tubular valve by means of bosses or lugs 21 oppositely secured to a collar 22 which is affixed to the valve, as by brazing, soldering or in any other suitable manner, to its external circumference. The opposite link ends are pivotally secured to a lever which is shown as one having bifurcated ends whereby each link 20 is connected thereto. Such lever 23 is preferably pivotally mounted upon a stud 15 journaled in a boss 19 on the head. One end terminates in a suitable handle 24 while the opposite end is forked, the bifurcations 25 passing about either side of the head and having each a link end secured thereby by a suitable pivotal mounting.

The central cylindrical body 1 has a pair of opposed apertures 26 through each of which projects one of the opposed lugs 21 carried by the reciprocatory valve. These apertures are of such dimension that full and free movement is afforded the lugs in the reciprocation. This body 1 is preferably formed in two parts to facilitate assemblage of the complete whole, the longitudinal union 27 on one side being shown in Fig. 1. Packing, stuffing washers, or other leakage-preventing means are employed and for this purpose, there have been provided packing rings 28. These rings function to prevent the escape of the fluid about the circumference of the tubular valve. While the valve 4 may be of a suitably effective length, it is shown in Fig. 2 as of a length such that, when the valve gate is opened, the end opposite the valve will project beyond the nipple end and therefore into the fluid container. Such construction prevents the collection or deposit within the faucet structure of any sediment carried in the fluid.

It will be noted that the construction is such that the packings 28 or either of them may be renewed without removing the nipple 3 from the container, it being necessary in the one case only to unscrew the cylindrical body 1 from the nipple 3, and in the other case only to unscrew the head 2 from the cylindrical body 1.

It will also be observed that the tube 4 which may be made of any suitable or desirable material presents a smooth liquid passage extending from the interior of the container to the valve seat, thus presenting no obstructions to the flow of liquid therethrough.

The operation of the device is simple and efficient. The nipple is screwed to the receptacle containing the fluid under pressure or secured to such portion thereof so that gravity functions to give rise to flow. The fluid enters the tubular valve 4 and its movement is arrested by the valve seat, escape around the exterior of the valve being prevented by the packing rings. Upon the elevation of the handle 24 from the position shown in Fig. 2, the linkage transmission causes the valve to become unseated whence the fluid is free to flow from the spout 11. At substantially the middle portion of the travel of the valve, the links are parallel to its longitudinal axis while throughout the remainder of the valve travel, the angle of the links to such axis of the valve is held to a minimum and it is obvious that the longer the link arm of the lever 23 the smaller does such possible departure from parallelism become. Such construction affords a faucet controlling mechanism which is durable, and which, for all practical purposes, eliminates the disadvantages of sidethrust which wears out the parts, destroys the alinement and ease of manipulation of the valve and interferes with the proper seating thereof. The device is durable and efficient, has few and easily assembled parts and is of low production cost.

It is to be understood that the construction disclosed herein is illustrative but not restrictive and that the same may be modified within the meaning and scope of the claim which follows.

Having fully described my invention, what I claim as new and desire to secure by Letters Patent is:

In a faucet, the combination of a hollow head having a discharge member; a valve seat in said head; a tubular body portion secured to said head; a nipple secured to the body portion; a tubular valve; said head, tubular body portion and nipple internally forming a bearing for the longitudinal reciprocation of said valve; a collar on said valve; said body portion having an interiorly enlarged portion to permit collar reciprocation; lugs on said collar on opposite sides of the valve and projecting through longitudinal slots in the body portion, said slots permitting reciprocation of the lugs but preventing rotative movement thereof; links pivotally mounted on said lugs and movable substantially rectilinearly; a forked lever pivotally mounted on the head and having its forked ends pivotally secured to the respective links, and a handle on the lever operable to impart substantially rectilinear movement to the links whereby the valve-controlling force is applied substantially in parallelism with its longitudinal axis.

In testimony whereof, I have signed my name to this specification.

THEODORE G. STRATER.

Copies of this patent may be obtained for five cents each, by addressing the "Commissioner of Patents, Washington, D. C."